INVENTOR.
GILBERT H. TUNNEY

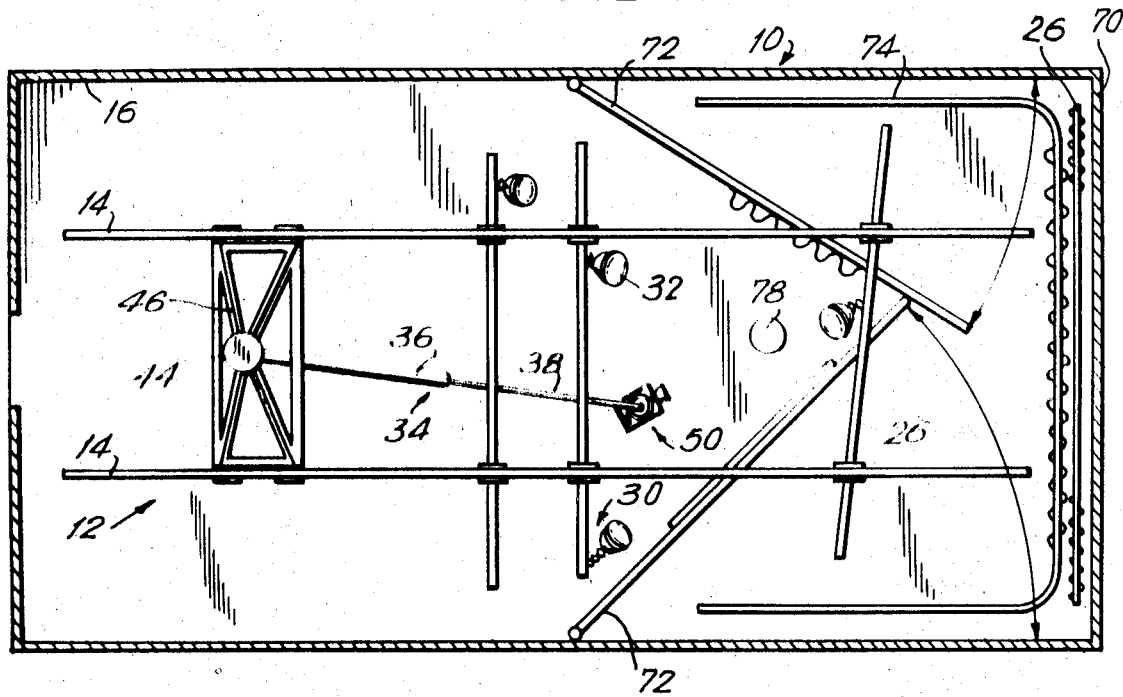
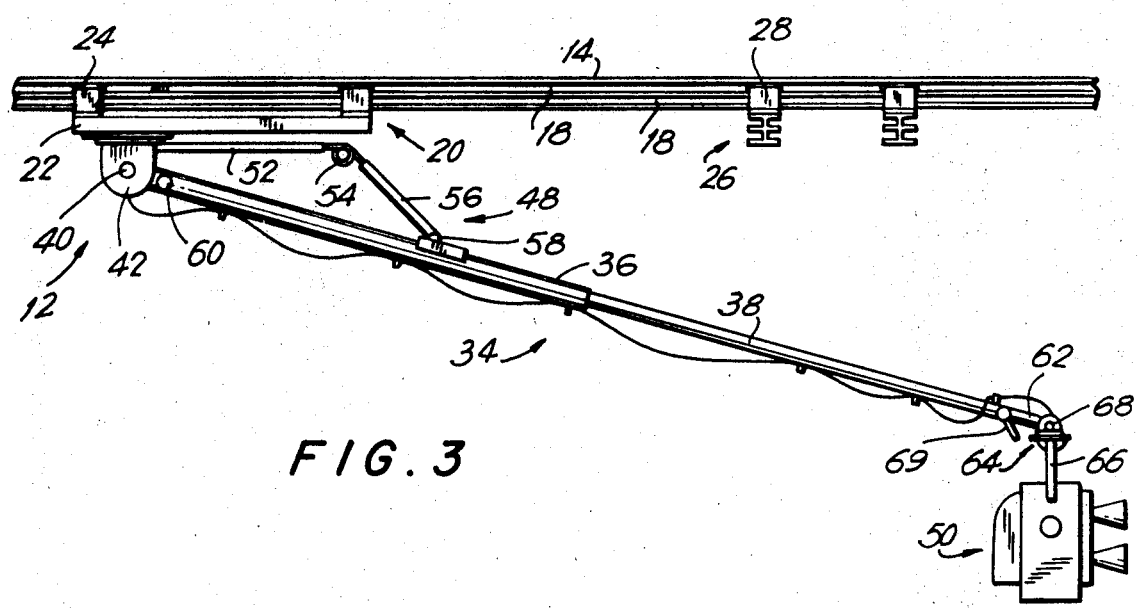

United States Patent Office 3,516,343
Patented June 23, 1970

3,516,343
CAMERA-POSITIONING APPARATUS
Gilbert H. Tunney, Hallam, Pa.
(107 E. Market St., York, Pa. 17401)
Filed July 26, 1967, Ser. No. 656,091
Int. Cl. G03b 15/06
U.S. Cl. 95—82                10 Claims

ABSTRACT OF THE DISCLOSURE

A camera-positioning apparatus for locating a camera at a selected position in a studio with respect to a subject which is to be photographed. An overhead guide member is situated over the operator of the camera and a carriage element is guided by the guide member for movement therealong. A support device is operatively connected to the carriage element for movement with the latter with respect to the guide member and movement with respect to the carriage element. The support device is operatively connected to a camera to carry the latter and is movable with respect to the carriage element to provide for the camera a position selected from a range of positions extending through an area greater than that occupied by the guide member. Thus, with this construction it becomes possible to situate the camera not only beneath the overhead guide member but also laterally beyond the latter.

BACKGROUND OF THE INVENTION

This invention relates to apparatus for supporting cameras so that a camera can be placed at a selected position with respect to a subject. In particular, the invention relates to that type of carriage-positioning apparatus which is adapted for use indoors, in a studio, for example.

Although apparatus of this general type is indeed known, the conventional apparatus is severely limited because the range of possible positions in which the camera can be placed is limited. For example, there are known constructions where it is possible to regulate the elevation of the camera and its angular position, but with the serious limitation that the camera must at all times be positioned within a space beneath an overhead guide which guides the structure which carries the camera. Thus, where the guiding structure extends along a central region of a room, it is not possible with the conventional structure to situate the camera adjacent the sides of the room.

SUMMARY OF THE INVENTION

It is accordingly a primary object of the invention to provide a camera-positioning apparatus which is capable of providing for a camera a range of possible positions of adjustment far beyond what has heretofore been possible with conventional structures of this general type.

In particular, it is an object of the present invention to provide for a camera a camera-positioning apparatus which is capable of enabling the operator to select for the camera a position from among a range of positions which extend through an area greater than that occupied by a guide means for guiding the structure which supports the camera.

In particular, it is an object of the present invention to provide a construction which makes it possible to quickly and conveniently position a camera throughout an angular range extending through 360° about a vertical axis as well as to adjust the camera in elevation, and in particular to provide for the camera a range of positions extending laterally beyond a pair of guide rails, for example, which support the camera-carrying structure for movement.

Thus, with the camera-positioning apparatus of the invention, there is an overhead guide means situated at an elevation higher than the camera operator, and a carriage means is supported by the guide means for movement therealong. A support means is itself carried by the carriage means for movement therewith with respect to the guide means, and the support means carries a camera and is movable with respect to the carriage means to provide for the camera a position selected from a range of positions extending through an area greater than that occupied by the guide means.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 2 is a schematic top plan view of the apparatus of the invention, the walls of the room or studio being shown in section in FIG. 2 while movable backgrounds are also schematically indicated in FIG. 2; and FIG. 3 is a schematic side elevation of the structure of the invention.

DESCRIPTION OF A PREFERRED EMBODIMENT

Figure 1:
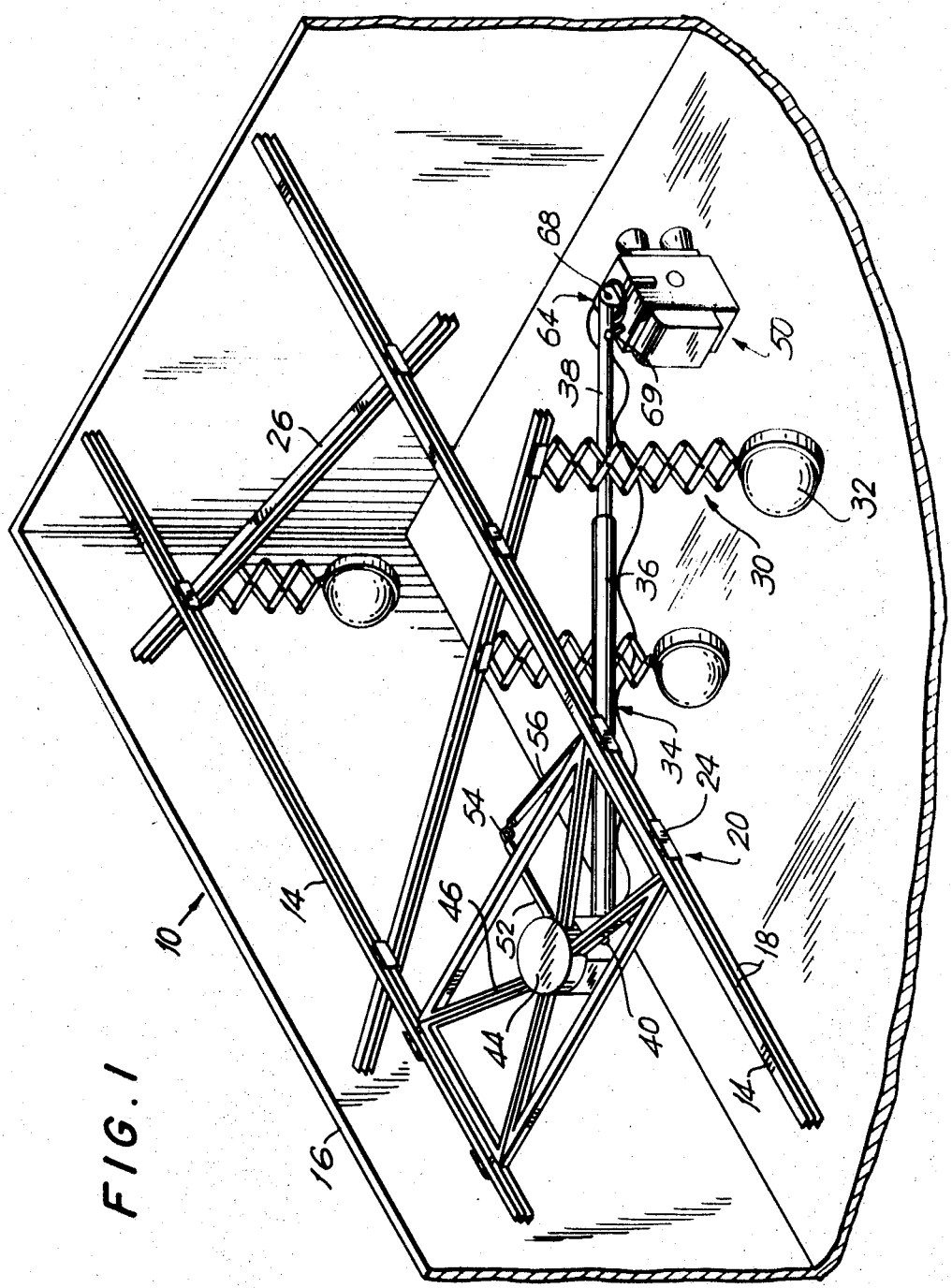
FIG. 1 is a fragmentary perspective illustration of a room, such as a photographer's studio, provided with the structure of the invention which is also illustrated in perspective in a schematic and partially fragmentary view in FIG. 1.

Referring now to the drawings, there is shown in FIG. 2, is a fragmentary schematic manner, a room 10, such as a photographer's studio. Situated in the room 10 adjacent and parallel to the unillustrated ceiling thereof is a guide means 12 including a pair of parallel rails 14 which are fixed in any suitable way to the ceiling of the room so as to be situated beneath and parallel to the latter as well as adjacent thereto. In this way the rails 14 form an overhead guide means. As is apparent particularly from FIG. 2, the rails 14 extend longitudinally of the studio 10 and are situated at a substantial distance inwardly of the side walls 16 thereof, extending parallel to these side walls. As is apparent particularly from FIG. 3, the rails 14 have grooves 18 formed in their outer side surfaces, these grooves being situated one above the other and separated by a suitable rib.

The grooves 18 receive rollers of a carriage means 20 in the form of a framework 22 providing a suitable platform for carrying structure which is described below. This framework 22 carries at its corners the roller assemblies 24 which have rollers situated in the grooves 18, so that the carriage means 20 is movable longitudinally of the guide means 12 along a central upper portion of the room 10 at an elevation higher than the camera operator.

The guide means 12 also serves to support transversely extending bars 26 formed with suitable grooves in their side surfaces, as is apparent from FIG. 3, and carrying also roller assemblies 28 received in the grooves 18 so that the transverse bars 26 are also movable along the rails 14. These bars 26 carry, through suitable vertically adjustable lazy-tong assemblies 30 lamps 32 for illuminating the subject which is to be photographed, and the range of possible adjustment of the lighting is apparent from FIGS. 1 and 2, in particular.

Situated beneath and carried by the carriage means 20 is a support means 34 of the present invention. This support means 34 includes an elongated telescopic boom having a main section 36 and a telescoping section 38. The main section 36 of the boom of the support means 34 is pivotally connected, as by a pivot 40, at its inner end to a swivel-fitting 42. This swivel-fitting is in the form of a pair of vertical plates between which the pivot 40 extends so as to be carried thereby with the inner end of the main boom section 36 situated also between the side plates of the swivel-fitting and the pivot 40 extends through the inner end of the main boom section 36 so as to support the latter for swinging movement about a horizontal axis which coincides with the axis of the pivot 40. The side plates of the swivel-fitting 42 are connected at their upper ends to a horizontal circular plate whose outer periphery is situated above an inner circular flange of a ring which is fixed at its outer periphery to the lower surface of a block 44 which is of circular configuration, as shown in FIGS. 1 and 2, and which is fixed to the inner ends of the diagonally extending bars 46 of the framework or platform 22. In this way the support means 34 provides for its telescopic boom not only swinging movement about a horizontal axis but also swinging movement about a vertical axis which is normal to a plane which contains the rails 14, and the range of adjustment about this vertical axis is through a complete 360°.

A spring means 48 is provided to counterbalance the weight of the boom of the support means and a camera 50 carried thereby, and this spring means 48 includes an upper rear relatively rigid portion 52 in the form of a suitable substantially rigid pipe, for example, which is fixed to the horizontal plate of the fitting 42 which swivels with the latter about the vertical axis. This pipe fixedly carries at its right end, as viewed in FIG. 3, one end of a loaded spring 54 whose opposite end is fixed to a second pipe 56 which is in turn pivotally connected at 58 to the main boom section 36. Thus, the loaded spring means 48 makes it relatively easy for the operator to swing the entire boom about the pivot 40. If desired the operator may reach up to turn a knob 60 which actuates any suitable releasable fixing structure for releasably fixing the boom in its adjusted position with respect to the axis of the pivot 40. For example, the pivot 40 may be fixed to the swivel-fitting 42 so that the main section 36 swings about the pivot 40, and turning of the knob 60 can cause a shank portion fixed to the knob 60 and situated in the pipe section 36 to actuate an eccentric which is fixed to the shank portion and which axially shifts along the interior of the section 36 a block which can be pressed against the fixed pivot 40 and which can be retracted away from the latter by turning the knob 60, so as to release the boom for swinging movement.

At its outer end 62, the telescopic boom section 38 carries a swivel-fitting 64 which is itself fixed to a U-shaped bracket 66 which directly carries the camera 50. The swivel-fitting 64 is pivoted at 68 to the outer end of the boom, so that irrespective of the angular position of the latter the camera can hang vertically while at the same time it will be turnable about a vertical axis, provided by the swivel-fitting 64 to orient the camera at a desired position with respect to the subject.

In accordance with the invention the length of the boom sections 36 and 38 is such that the latter may be extended outwardly beyond the main section 36 to an extent which will situate the outer end 62 of the boom laterally beyond the space beneath a horizontal plane which extends between and is limited by the rails 14. In fact, the length of the boom is such that in its extended position the camera can be situated adjacent the side walls 16 of the room 10. At the same time, it is also possible to position the camera beneath the horizontal plane which extends between the rails 14, and the elevation of the camera can be any desired elevation while at the same time it can be swung about the vertical axis provided by the swivel fitting 42 through a complete 360°, so that the camera can be positioned either rearwardly of or forwardly of the carriage means 20. In this way an exceedingly large range of positions for the camera 50 is provided.

In order to fix the boom in its extended position there is accessible to the operator a swingable lock lever 69 adjacent the outer end 62 of the boom and carrying in the interior of the telescopic section 38 an eccentric capable of longitudinally shifting a rod which carries at its end which is situated within the overlapping outer portion of the main boom section 36 a frustoconical member for pressing against split tongue portions at the inner end of the telescopic section 38 which is situated at all times within the main section 36, so that in this way a structure similar to that used for fixing a collet in a lathe is provided within the telescopic section 38 for releasably fixing the latter at an extended position with respect to the main boom section 36.

As is apparent from FIG. 2, there are situated adjacent the side walls 16 as well as adjacent an end wall 70 of the room 10 background units 72, 74, and 76 which are capable of being used in any conventional manner in connection with a subject which is to be photographed, and such a subject 78 is schematically indicated in FIG. 2 in front of a pair of laterally swingable backgrounds 72. The tops of the backgrounds are situated beneath the elevation of the rails 14 so that the backgrounds can be moved to any desired position with respect to a subject, such as subject 78.

It is therefore apparent that with the structure of the invention it is possible to situate the camera 50 in a quick, convenient manner at almost any desired part of the room 10 so that any position with respect to a subject which is to be photographed can be provided with the camera-positioning apparatus of the invention.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. Camera-positioning apparatus comprising overhead guide means situated at an elevation over the operator of a camera, carriage means guided by said overhead guide means for movement therealong, and adjustable support means carried by said carriage means for movement therewith and for adjustable movement with respect thereto, said adjustable support means being operatively connected with a camera to carry the latter and to provide for the camera a position selected from a range of positions extending over an area greater than that occupied by said guide means by an extent sufficient to situate said camera beneath or in its entirely substantially beyond said guide means, said adjustable support means being elongated and extending laterally from an axis normal to a plane containing said guide means, and said adjustable support means being connected to said carriage means for swivelling movement with respect thereto about said axis.

2. The combination of claim 1 and wherein said support means coacts with said carriage means to support a camera for adjustment in elevation as well as laterally through a range of positions extending beyond said guide means.

3. Camera-positioning apparatus comprising overhead guide means situated at an elevation over the operator of a camera, carriage means guided by said overhead guide means for movement therealong, and adjustable support means carried by said carriage means for movement therewith and for adjustable movement with respect thereto, said adjustable support means being operatively connected with a camera to carry the latter and to provide for the camera a position selected from a range of positions extending over an area greater than that occupied by said guide means, so that the camera can be positioned beneath or beyond said guide means, said guide means including a pair of parallel rails situated at a given distance from each other, said carriage means being movable longitudinally of said rails, and said support means including an elongated telescopic boom connected at one end to said carriage means for swivelling movement with respect thereto about an axis normal to a plane which contains said rails, and said telescopic boom having an extended position where an outer end of said boom situated distant from said carriage means is located laterally beyond said rails with both of the latter situated on the same side of said outer end of said boom, said outer end of said boom being operatively connected to a camera to support the latter.

4. The combination of claim 3 and wherein said boom is connected to said carriage means for swiveling movement with respect thereto about said axis through 360°.

5. The combination of claim 3 and wherein a spring means is connected at one end to said carriage means for swiveling with said boom and at an opposite end to said boom for counterbalancing the weight thereof and a camera carried thereby.

6. The combination of claim 5 and wherein said boom is connected to said carriage means not only for swiveling movement with respect thereto about said axis but also for swinging movement with respect thereto about a second axis which intersects said axis which is normal to said plane and which is parallel to said plane, so that the elevation of a camera carried by said boom can be adjusted.

7. Camera-positioning apparatus comprising overhead guide means situated at an elevation over the operator of a camera, carriage means guided by said overhead guide means for movement therealong, and adjustable support means carried by said carriage means for movement therewith and for adjustable movement with respect thereto, said adjustable support means being operatively connected with a camera to carry the latter and to provide for the camera a position selected from a range of positions extending over an area greater than that occupied by said guide means, so that said camera can be positioned beneath or beyond said guide means, said guide means including a pair of parallel rails located in a common horizontal plane, said carriage means being located in a horizontal plane parallel to that of said rails and being movable longitudinally therealong, said support means including a telescopic boom, and a fitting connected to said carriage means for swiveling movement with respect thereto about a vertical axis through 360°, said boom having an inner end connected to said fitting for swiveling movement therewith and also connected to said fitting for swinging movement relative thereto about a horizontal axis, so that the angular position of said boom with respect to said vertical and horizontal axes can be adjusted, said boom having an outer end distant from said fitting and operatively connected with a camera to carry the latter, and said boom having an extended range position where said outer end thereof can be situated on either side of and beyond both of said rails.

8. The combination of claim 7 and wherein a spring means has one end connected to said fitting and an opposite end pivotally connected to said boom to counterbalance the weight of the latter and a camera carried thereby.

9. The combination of claim 8 and wherein said boom includes at least one main section connected directly to said fitting and said spring means and at least one additional telescoping section telescopically slidable with respect to said main section.

10. The combination of claim 9 and wherein said support means is operatively connected at said outer end of said boom thereof to a camera to provide for the latter adjustable movement relative to said outer end of said boom.

References Cited

UNITED STATES PATENTS

| | | | |
|---|---|---|---|
| 2,675,462 | 4/1954 | Newton | 240—1.4 |
| 2,713,609 | 7/1955 | Niklason | 95—86 |
| 2,758,196 | 8/1956 | Greppin | 240—1.4 |
| 2,866,101 | 12/1958 | Wagner et al. | 248—280 |
| 2,905,806 | 9/1959 | Tunney | 240—9 |
| 3,399,614 | 9/1968 | Fischer | 95—86 |

NORTON ANSHER, Primary Examiner

F. L. BRAUN, Assistant Examiner

U.S. Cl. X.R.

240—1.3, 9